(12) United States Patent
Jones

(10) Patent No.: US 11,136,477 B2
(45) Date of Patent: Oct. 5, 2021

(54) HAND WRAP FOR MUSICAL INSTRUMENT

(71) Applicant: Cheryl Lynn Jones, New Smyrna Beach, FL (US)

(72) Inventor: Cheryl Lynn Jones, New Smyrna Beach, FL (US)

( * ) Notice: Subject to any disclaimer, the term of this patent is extended or adjusted under 35 U.S.C. 154(b) by 0 days.

(21) Appl. No.: 16/212,041

(22) Filed: Dec. 6, 2018

(65) Prior Publication Data

US 2019/0119527 A1 Apr. 25, 2019

Related U.S. Application Data

(63) Continuation of application No. 15/593,166, filed on May 11, 2017, now abandoned.

(51) Int. Cl.
| | | |
|---|---|---|
| *C09J 7/22* | (2018.01) | |
| *G10G 5/00* | (2006.01) | |
| *C09J 7/21* | (2018.01) | |

(52) U.S. Cl.
CPC . *C09J 7/22* (2018.01); *C09J 7/21* (2018.01); *G10G 5/005* (2013.01); *C09J 2301/122* (2020.08); *C09J 2400/263* (2013.01); *C09J 2400/283* (2013.01); *C09J 2401/006* (2013.01)

(58) Field of Classification Search
CPC ....... C09J 7/02; C09J 7/026; C09J 7/04; C09J 7/21; C09J 7/22; C09J 2400/283; C09J 2400/263; C09J 2401/006; C09J 2201/122; G10G 5/005
See application file for complete search history.

(56) References Cited

U.S. PATENT DOCUMENTS

| | | | | |
|---|---|---|---|---|
| 1,765,609 A | * | 6/1930 | Orr | A41D 17/00 36/2 R |
| 2,152,648 A | * | 4/1939 | Bartlett | A47G 7/085 47/72 |
| 2,166,048 A | * | 7/1939 | Fritsch | G09F 21/04 40/591 |
| 2,190,055 A | * | 2/1940 | Davidson | B42D 3/04 281/34 |
| 2,425,961 A | * | 8/1947 | Shattuck | A41B 13/10 2/49.3 |
| 2,841,147 A | * | 7/1958 | McLaurin | A61F 17/00 604/347 |
| 3,146,464 A | * | 9/1964 | Burnett | A41B 13/103 2/49.3 |
| 3,319,686 A | * | 5/1967 | Prevette | B24D 9/02 451/451 |
| 4,057,066 A | * | 11/1977 | Taylor | A61M 25/02 604/180 |
| 4,301,544 A | * | 11/1981 | Burton | A41B 13/106 2/49.5 |

(Continued)

*Primary Examiner* — Patricia L. Nordmeyer
(74) *Attorney, Agent, or Firm* — Andrew Morabito

(57) ABSTRACT

An apparatus, comprising; a piece of material having a first end and a second end and a first side and second side, wherein the piece of material has a predetermined length and width of approximately, an adhesive member having a first side and a second side, wherein each side has adhesive properties, and the adhesive member is attached distal to the first end of the piece of material on the first side, a removable cover, detachably secured to the adhesive member exposed side, and at least one tie attached to the to the second end of the piece of material.

6 Claims, 3 Drawing Sheets

(56) References Cited

U.S. PATENT DOCUMENTS

| | | | | |
|---|---|---|---|---|
| 4,428,079 A * | 1/1984 | McKee | ............... | A45D 44/12 |
| | | | | 2/11 |
| 5,443,670 A * | 8/1995 | Landau | ............... | B65D 85/505 |
| | | | | 156/184 |
| 5,727,575 A * | 3/1998 | Rontal | ............... | A45D 8/34 |
| | | | | 132/200 |
| 5,816,253 A * | 10/1998 | Sosebee | ............... | A61B 46/30 |
| | | | | 128/849 |
| 6,384,294 B1 * | 5/2002 | Levin | ............... | A61F 13/0203 |
| | | | | 602/41 |
| 10,189,588 B2 * | 1/2019 | Milbrandt | ............... | B65B 13/02 |
| 2015/0239615 A1 * | 8/2015 | O'Donnell | ............... | B65D 25/20 |
| | | | | 428/41.8 |
| 2018/0327636 A1 * | 11/2018 | Jones | ............... | C09J 7/21 |

* cited by examiner

HAND WRAP FOR MUSICAL INSTRUMENT

BACKGROUND OF THE INVENTION

The present invention relates to garment, and more particularly to a garment that allows for easy removal of the feet and hand covers.

Handheld items, such as musical instruments, often have a cylindrical handle for a user to hold while using the item. For example, a rain stick or a maraca may be handheld by a user via a cylindrical handle. If the user is vigorously utilizing the handheld item, the user may transfer perspiration, germs, dirt, or other unsanitary particles onto the handle. If the item is then handed to another user for subsequent use, the perspiration, germs, dirt and other unsanitary particles may remain on the handle and thereby be transferred to the subsequent user.

Programs that involve physical activity are important in elder care. Such programs may include music, wherein elderly persons are instructed in the playing of musical instruments. Handheld percussion instruments, such as rain sticks, maracas, drums, etc., are popular instruments for such elder care music programs. But such physical activity programs can expose elderly persons to the above described problem of transferring perspiration, germs, dirt, and other unsanitary particles from one user of a handheld musical instrument to a subsequent user of the handheld musical instrument. And because elderly persons may be at a greater risk for the transfer of communicable diseases due to their compromised immune systems), this is a particularly dire threat.

There is a need, therefore, for a disposable handle wrap for use on handheld items to avoid the transfer of unsanitary particles from one user of a handheld item to a subsequent user of the handheld item.

SUMMARY

The present invention in a first embodiment is an apparatus, comprising; a piece of material having a first end and a second end and a first side and second side, wherein the piece of material has a predetermined length and width of approximately, an adhesive member having a first side and a second side, wherein each side has adhesive properties, and the adhesive member is attached distal to the first end of the piece of material on the first side, a removable cover, detachably secured to the adhesive member exposed side, and at least one tie attached to the to the second end of the piece of material.

The present invention in a second embodiment, is a piece of material having a first end and a second end and a first side and second side, wherein the piece of material has a predetermined length and width of approximately, an adhesive member having a first side and a second side, wherein each side has adhesive properties, and the adhesive member is attached distal to the first end of the piece of material on the first side, a removable cover, detachably secured to the adhesive member exposed side, and at least one tie attached to the to the second end of the piece of material.

In a third embodiment, the present invention is a method of using the apparatus, comprising the steps of; providing a piece of material having a first end and a second end, an adhesive member attached distal to the first end of the piece of material, and at least one tie attached to the to the second end of the piece of material and a handle, attaching the piece of material to the handle by securing the at least one tie around the handle, wrapping the piece of material around the handle, and attaching the adhesive member to the piece of material, wherein the piece of material is secured in place.

DETAILED DESCRIPTION OF INVENTION

Figure 1A:
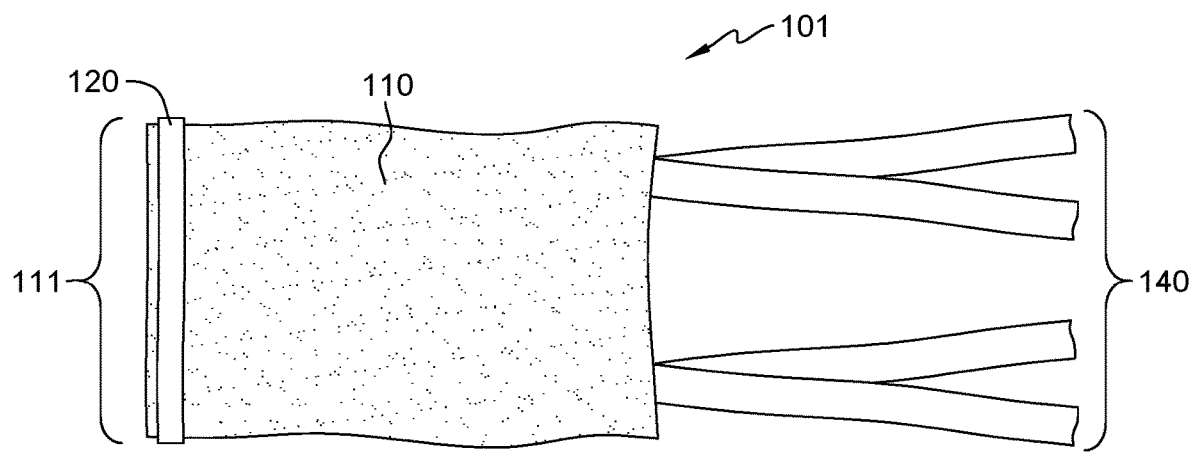
FIG. 1A depicts an image of the disposable handle wrap apparatus, in accordance with one embodiment of the present invention.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. It is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements or use of a "negative" limitation.

The present invention is generally related to sanitation of handheld items, and more particularly related to a disposable handle wrap apparatus for use on handheld items, such as musical instruments, so as to avoid the transfer of unsanitary particles (such as germs) from one user of the handheld item to the next user of the handheld item.

Handheld items, such as musical instruments, often have a cylindrical handle for a user to hold while using the item. For example, a rain stick or a maraca may be handheld by a user via a cylindrical handle. If the user is vigorously utilizing the handheld item, the user may transfer perspiration, germs, dirt, or other unsanitary particles onto the handle. If the item is then handed to another user for subsequent use, the perspiration, germs, dirt and other unsanitary particles may remain on the handle and thereby be transferred to the subsequent user. The present invention avoids this situation by providing a disposable handle wrap that may be removably attached to a handle of an item during a user's use of the item. After the user is done with his or her use of the item, the disposable handle wrap may be removed so that the user's unsanitary particles are not transferred to a subsequent user of the handheld item.

Handheld items, such as musical instruments, often have a cylindrical handle for a user to hold while using the item. For example, a rain stick or a maraca may be handheld by a user via a cylindrical handle. If the user is vigorously utilizing the handheld item, the user may transfer perspiration, germs, dirt, or other unsanitary particles onto the handle. If the item is then handed to another user for subsequent use, the perspiration, germs, dirt and other unsanitary particles may remain on the handle and thereby be transferred to the subsequent user.

Programs that involve physical activity are important in elder care. Such programs may include music, wherein elderly persons are instructed in the playing of musical instruments. Handheld percussion instruments, such as rain sticks, maracas, drums, etc., are popular instruments for such elder care music programs. But such physical activity programs can expose elderly persons to the above described problem of transferring perspiration, germs, dirt, and other unsanitary particles from one user of a handheld musical instrument to a subsequent user of the handheld musical instrument. And because elderly persons may be at a greater risk for the transfer of communicable diseases (due to their compromised immune systems), this is a particularly dire threat.

There is a need, therefore, for a disposable handle wrap for use on handheld items to avoid the transfer of unsanitary particles from one user of a handheld item to a subsequent user of the handheld item.

The herein disclosed disposable handle wrap apparatus for use on handheld items, such as musical instruments, is intended to help avoid the transfer of germs and other unsanitary particles from one user of the handheld item to the next user of the handheld item as well as provide assistance for user's which had difficult grasping or holding on to handheld items. The disposable handle wrap may be removably attached to a handle of an item during a user's use of the item. After the user is done with his or her use of the item, the disposable handle wrap may be removed so that the user's unsanitary particles are not transferred to a subsequent user of the handheld item.

Figure 1B:
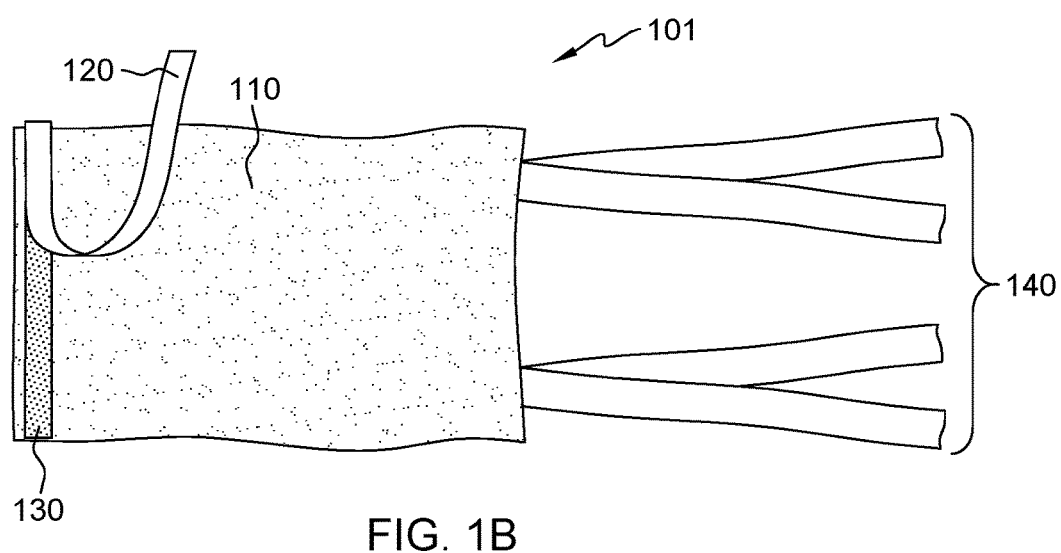
FIG. 1 depicts an image of a disposable handle wrap apparatus, in accordance with one embodiment of the present invention.

As depicted in FIGS. 1A-1B, a disposable handle wrap apparatus 101 is shown, in accordance with one embodiment of the present invention. The disposable handle wrap apparatus 100 is shown comprised of a wrap body 110 formed of a non-toxic material and having a predetermined height and width, an adhesive strip 130 spanning the width, an adhesive strip cover 120 removably attached to the wrap body 110, and ties 140 attached to the opposite end of the wrap body 110 as the adhesive strip 130. An exemplary embodiment of the herein disclosed disposable handle wrap apparatus 101 may comprise: a wrap body formed of a non-toxic cotton material and having a height of approximately 9 inches, a width of approximately 7 inches, and an adhesive strip 130 spanning the width and the adhesive strip cover 130 removably attached to the adhesive strip 120. An embodiment of the present invention may include one or more ties 140, which may be formed of a plastic material, for tying the disposable handle wrap apparatus 101 to a handle and thus more securely attaching the handle wrap to a handle during use.

The non-toxic material may be made from various disposable and reusable materials, such as, but not limited to, cotton, polyester, microfiber, silk, wool, or other hybrid fabrics. In some embodiments, the material is elastic or has elastic properties to provide a tighter fit. Alternatively, the non-toxic material may be a paper. In another alternative, the non-toxic material may include more than one material combined together to form wrap body 110 and may include soft and/or fibrous materials to increase absorption and grip. For example, the non-toxic material may be formed of a plastic central layer having a layer of cotton on one or both sides. Those skilled in the art will appreciate that wrap body may be formed of any material that provides a non-slip (or somewhat non-slip) grip to a user, while also providing for some absorption of unsanitary particles from a user's hand, and all such materials are intended to be included herein. Unsanitary particles include perspiration, germs, dirt, etc. Disposable handle wrap apparatus 101 also includes adhesive strip cover 120, which is removably attached to wrap body 110. Adhesive strip covers 120 may be formed of the same material as wrap body 110, or alternatively, may be formed of a different non-toxic material such as a plastic material or a paper material. Adhesive strip covers 120 may extend beyond the edges (on each side, or alternatively, on a side) of wrap body 110 so as to provide an accessible tab of adhesive strip cover 120 that hangs beyond the wrap body 120 for facilitating easy removal of adhesive strip cover 120 by a user. Disposable handle wrap apparatus 101 may also, in certain embodiments, include one or more ties 140 for tying disposable handle wrap 101 to a handle. Ties 140 may be one tie protruding from wrap body 110, or alternatively ties 140 may include a plurality of ties protruding from wrap body 110. The ties 140 may include a first tie having two strands (the two strands for tying together around the handle, much like shoe laces) and a second tie also having two strands, wherein the first tie protrudes from a side of wrap body 110 and the second tie also protrudes from the same side of wrap body 110. The ties 140 may, for example, be formed of a plastic material comprising a central layer of wrap body 101, so that the central layer continuously forms ties 140.

The width may be, in an exemplary embodiment, approximately 7 inches. The height may be, in an exemplary embodiment, approximately 9 inches. But those skilled in the art will appreciate that the herein disclosed disposable handle wrap apparatus may be formed in alternative dimensions without deviating from the intended purpose, and so all such dimensions for height, width, and thickness are intended to be included herein. For example, the disposable handle wrap apparatus may be formed in an extra-long embodiment, wherein the height may be 24 inches and the width may be 7 inches.

The wrap body 110 further includes adhesive strip 130 spanning the width of wrap body 110. Adhesive strip 130 may be formed of any adhesive material (such as a synthetic glue, for example) capable of removably attaching the disposable handle wrap 101 to a handle of a handheld item. Adhesive strip 130 may be layered directly to a surface of wrap body 110, beneath adhesive strip cover 120. In some embodiments, the adhesive strip 130 may be a reusable fastening mechanism for embodiments where the wrap body is reusable. For example a hook and loop style fastener, or the like.

The wrap body 101 may have a thickness of between approximately $1/16^{th}$ inches and $1/8$th inches. Those skilled in the art will recognize that alternative thicknesses for thickness may provide for the functionality of the disposable handle wrap apparatus disclosed herein, and all such alternative thicknesses are intended to be included herein.

Figure 2:
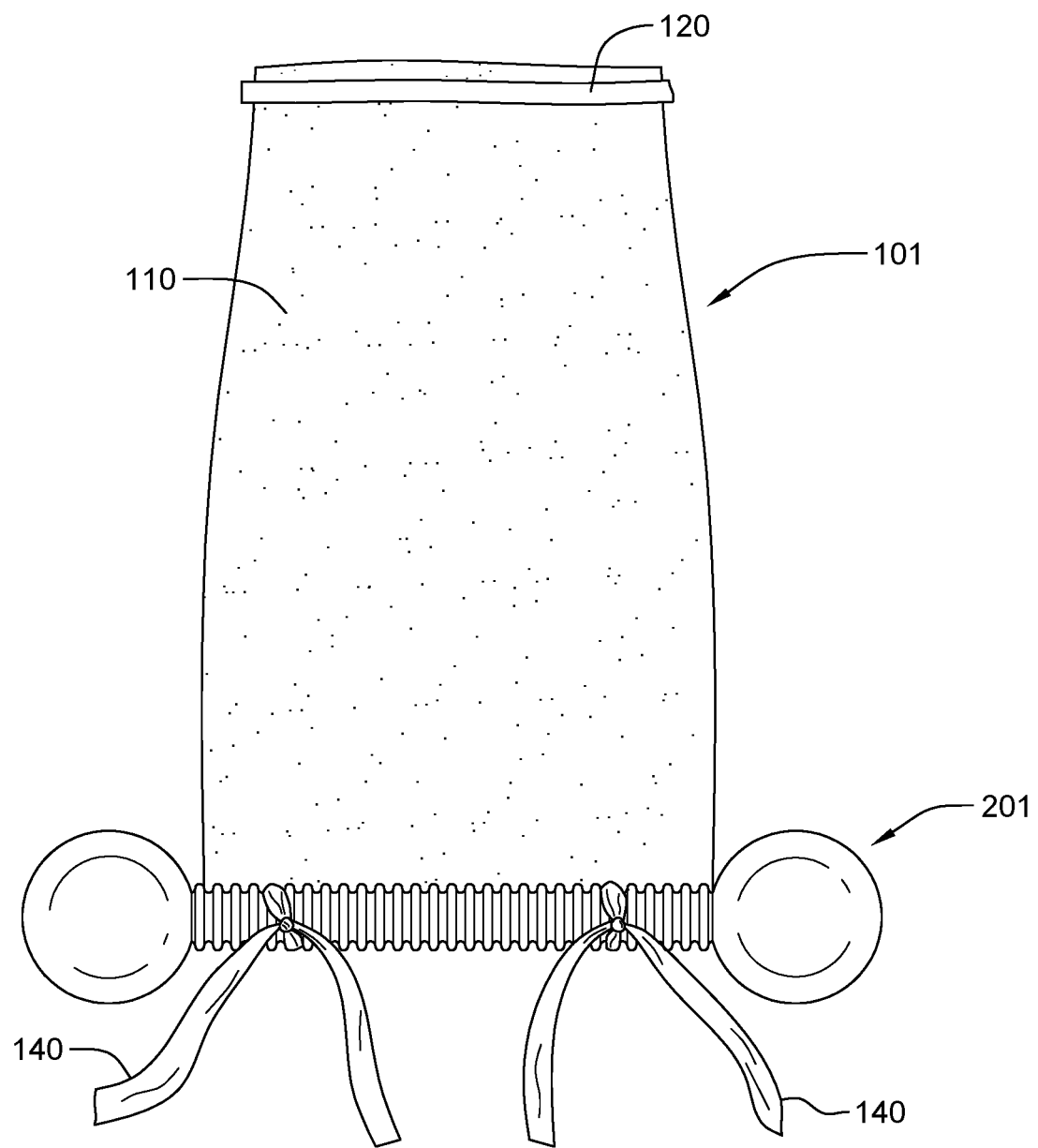
FIG. 2 depicts an image of the disposable handle wrap apparatus attached to an instrument, in accordance with one embodiment of the present invention.
Figure 3:
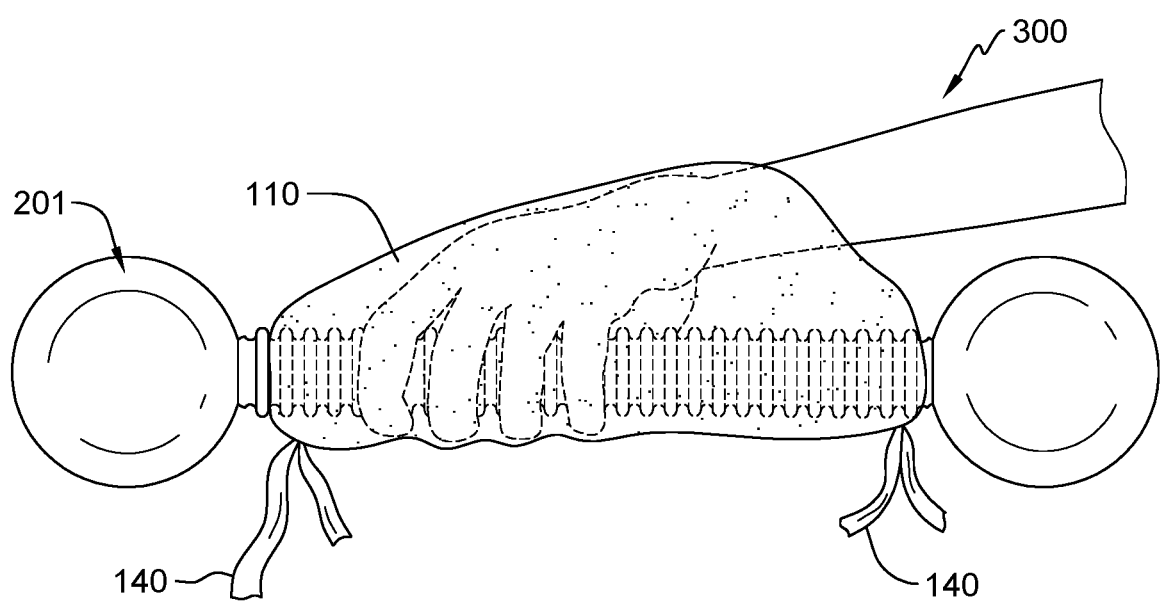
FIG. 3 depicts an image of the disposable handle wrap apparatus in use, in accordance with one embodiment of the present invention.

Depicted in FIGS. 2-3 is the disposable handle wrap apparatus 101 in use with a handle 201. The disposable handle wrap apparatus 101 is shown tied to the handle 201 through the use of the ties 140. The ties 140 are of various lengths based on the handle 201 size, and the type of material used in the ties 140. When a user wishes to utilize the herein disclosed disposable handle wrap apparatus 101, the user begins by tying the ties 140 around the handle 201 (or item), grabbing the handle 201 with their hand 300, and then removing adhesive strip cover 120 from wrap body 110, to expose adhesive strip 130. The user then wraps wrap body 110 around the handle 201 and the user's hand 300, so that adhesive strip 130 is positioned inward. Adhesive strip 130 adheres to wrap body 100 and thus temporarily secures the user's hand 300 to the handle 201 handle 201. When using an embodiment of the present invention having ties 140, a user would begin by tying ties 140 to a handle, before wrapping wrap body 110 around the handle. With disposable handle wrap 101 temporarily attached to handle 201, the wrap body 110 will absorb at least a portion of any unsanitary particles present on the user's hand during use of the item encompassing handle 201. After the user is done utilizing the item, wrap body 110 may be removed from handle 201. At this time, disposable handle wrap apparatus 101 may be disposed, and a new disposable handle wrap may be wrapped around handle 201. In this way, the subsequent user of the item encompassing handle 201 may avoid contact with unsanitary particles present on the previous user's hand.

The herein disclosed disposable handle wrap apparatus also provides for an alternative use when utilized with a user who suffers from a debilitating condition, such as nerve damage, that makes gripping a handle difficult. In this situation, the user's hand may be placed directly on the handle, and the herein disclosed disposable handle wrap may be wrapped around both the handle and the user's hand, thus securing the item to the user's hand. In this way, a person suffering from nerve damage may nonetheless be assisted in gripping the handle during use. While this is intended to be an alternative use of the herein described apparatus, those skilled in the art may recognize that for such a situation, it may be advantageous to form the disposable handle wrap apparatus with a greater width than the generally suggested 7 inches, in order to more completely surround both the user's hand and the handle itself.

While the present invention has been illustrated and described herein in terms of a preferred embodiment and several alternatives, it is to be understood that the systems and methods described herein can have a multitude of additional uses and applications. Accordingly, the invention should not be limited to just the particular description and various drawing figures contained in this specification that merely illustrate a preferred embodiment and application of the principles of the invention.

What is claimed is:

1. An hand wrap for musical instruments, comprising:
a cover formed a first layer of absorbent material, a second layer of plastic material, and third layer of absorbent material wherein the plastic material is positioned between the two layers of absorbent material, and having a first end and a second end, wherein the piece of material is sized based on a handle of a musical instrument;
an adhesive member attached parallel and along an edge of the first end of the cover, wherein the adhesive member spans substantially the entire length of the first end of the cover;
a protective cover removably secured to the adhesive member; and
two sets of tie attachments, wherein one of the sets of tie attachments is connected to a first corner of the second end and the second set of tie attachments is connected to a second corner of the second end of the cover.

2. The apparatus of claim 1, wherein the adhesive member has a first side and a second side, and both sides have adhesive properties and the adhesive member is attached to the piece of material on the first side.

3. The apparatus of claim 1, wherein the piece of material has a length which is greater than the width.

4. The apparatus of claim 3, wherein the piece of material has a length of at least nine inches, and a width of at least 7 inches.

5. The apparatus of claim 1, wherein the piece of material has a thickness of at least one sixteenth of an inch.

6. The apparatus of claim 1, wherein the at least one tie is attached to the first end of the piece of material a predetermined distance from one another.

* * * * *